Jan. 26, 1960

E. RODRIGUEZ 2,922,702

GASOLINE IN GRANULATED FORM

Filed Nov. 22, 1952

*INVENTOR.*
*Eustasio Rodriguez.*

BY

*William F. Nickel*
ATTORNEY.

United States Patent Office 2,922,702
Patented Jan. 26, 1960

2,922,702

GASOLINE IN GRANULATED FORM

Eustasio Rodriguez, New York, N.Y.

Application November 22, 1952, Serial No. 321,980

1 Claim. (Cl. 44—7)

My invention is an improved kind of gasoline and other hydrocarbons and certain of their derivatives; and has for its chief object to produce such a substance in the form of particles that are perfectly dry or in another non-fluid condition, and can be handled in storing, shipping, or using with great advantage.

Non-fluid gasoline and other hydrocarbons are already known but previous methods worked out for this purpose yield mostly a solidified mass that is not granular. By my invention a dry granular condition can be fully and readily obtained.

This result is gained by adding to the solidifying medium an ingredient that accelerates the transformation of the liquid, causing the granulation to take place the more readily and to a more marked extent, and giving a composition that is in great measure dry, uniform and hard.

The nature of the invention is made clear in the following description and the novelty thereof is defined in the appended claim.

Figure 1:
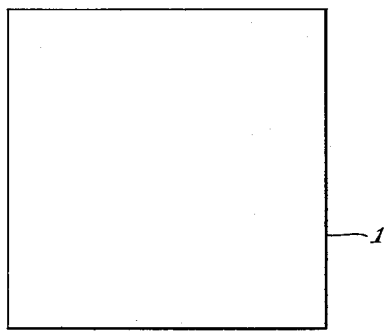

On the drawings:

Figure 1 indicates the volume of the original liquid treated.

Figure 2:
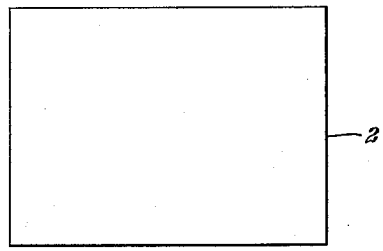

Figure 2 indicates the reduced volume of the final product; and

Figure 3:
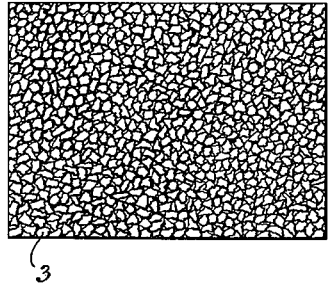
Figure 4:
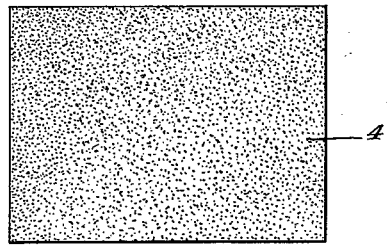
Figure 5:
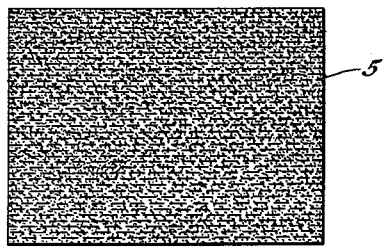

Figures 3, 4 and 5 show diagrammatically the same reduced volume of the product in the granular, powdered and pasty state respectively.

I make an aqueous mixture, consisting, for example, of 100 grams of cold water, 5 grams of ammonia, and 2 grams of sodium pyrophosphate. Then I stir. Then 10 grams of casein are added. These four ingredients will solidify at least 1500 grams of gasoline, or even from 1500 to 2000 grams, depending on the consistency required. The ammonia is the standard liquid obtainable from establishments supplying that product and other chemical substances and is commonly known as 26-degree ammonia.

The gasoline is treated by pouring it into the above-named mixture, which has the state of a thick emulsion, drop by drop, at first, and very slowly. The mingling of the emulsion and gasoline is accomplished with constant stirring. As the action advances, the gasoline is poured more rapidly and the stirring is also quickened. Any type of gasoline can be worked in this way, and no heat at all is needed.

While I have specified herein the quantities of the various materials used, I do not limit myself to the precise amounts or proportions stated.

The sodium pyrophosphate is essential because it renders the product uniform and causes the granulation to set in more rapidly and become pronounced and complete, the particles of the final product being both dry and comparatively hard. If this ingredient is omitted the final substance is less uniform, less granular, less hard and less dry; in fact a very noticeable quantity of moisture or fluid may be present.

I have found that with this process and the mixture described consisting of cold water, ammonia, sodium pyrophosphate, and casein, I can solidify and obtain in granular form with equal facility, kerosene, petroleum ether and carbon tetrachloride, the sodium pyrophosphate plays the same part as before, completing the process, promoting the granulation and making the product dry, hard and of uniform quality throughout.

Obviously solid gasoline, and the other substances above-mentioned, in dry, hard and granulated condition can be handled more conveniently and packed, stored and shipped in non-metallic containers. The chemical and physical properties are not changed; and in particular, there is no reduction in the heat content or fuel value of either the gasoline or kerosene. The product yielded by my improved method is also quite stable and does not deteriorate with the passage of time.

The sodium pyrophosphate is a sufficient solvent, and the ammonia can be admitted if desired. The ammonia water acts as a preservative and prevents the product from soon putrefying and giving off a bad smell also, the sodium pyrophosphate can be increased to as much as 7 grams and as much as 20 grams of casein can be employed. A thick, dry and granular product will result. This product, as stated above, is more easily packed, stored and shipped, not only because it is solid and made up of particles of relatively small size, but also because during the process the materials contract in volume, and the final product may show a reduction in the volume of as much as 25%, without loss of any of the ingredients. Throughout this process no heat is needed.

The relative volume of the liquid mixed in with the other ingredients above mentioned is indicated by the area of the square 1 in Figure 1, and the volume of the finished granular product is indicated by the square of smaller area 2 in Figure 2. The granular condition and volume is indicated at 3 on Figure 3. The shrinkage is accompanied by no loss of heating power or weight. With decreased volume, more of the product can be put into the same space for shipment or storage.

By increasing the amount of sodium pyrophosphate the final product may be given a finely powered condition in the same reduced volume as indicated at 4 in Figure 4. This effect can be gained with sodium pyrophosphate and the other substances in the amounts specified above. On the other hand, by decreasing the sodium pyrophosphate to grams, and keeping the amounts of the other ingredients unchanged, a pasty mass having the same volume and properties (except for pastiness) as shown at 5, is formed.

Having described my invention what I claim is:

A stable, solid product in the form of separate small granular particles and containing the following ingredients in substantially the proportions named:

| | Grams |
|---|---|
| Gasoline | 1500–2000 |
| Water | 100 |
| Casein | 10 to 20 |
| Sodium pyrophosphate | 2 to 7 |
| Ammonia water | 5 |

References Cited in the file of this patent

UNITED STATES PATENTS

| 666,010 | Helbing et al. | Jan. 15, 1901 |
| 1,880,211 | Prussin | Oct. 4, 1932 |
| 2,293,385 | Dunham | Aug. 8, 1942 |
| 2,356,795 | Poarch | Aug. 29, 1944 |

FOREIGN PATENTS

| 372,173 | France | Feb. 14, 1907 |

OTHER REFERENCES

Monsanto Tech. Bulletin No. P-24, June 15, 1940, pp. 1 and 6.